United States Patent
Tortora et al.

(10) Patent No.: US 11,215,952 B2
(45) Date of Patent: Jan. 4, 2022

(54) WATCH COMPRISING AN ELEMENT PROVIDED WITH AN ILLUMINABLE INDEX

(71) Applicant: The Swatch Group Research and Development Ltd, Marin (CH)

(72) Inventors: Pierpasquale Tortora, Neuchatel (CH); Michael Stalder, Bellmund (CH); Olga Reinauer, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 342 days.

(21) Appl. No.: 16/381,795

(22) Filed: Apr. 11, 2019

(65) Prior Publication Data

US 2019/0361400 A1    Nov. 28, 2019

(30) Foreign Application Priority Data

May 23, 2018    (EP) .................................... 18173871

(51) Int. Cl.
G04B 19/30        (2006.01)
G04C 10/00       (2006.01)
H01M 6/34         (2006.01)

(52) U.S. Cl.
CPC ............. G04B 19/30 (2013.01); G04C 10/00 (2013.01); H01M 6/34 (2013.01)

(58) Field of Classification Search
CPC ...... G04B 19/30; G04B 19/283; G04C 10/00; G04C 17/02; H01M 6/34; G04F 10/00; G04G 21/02

(Continued)

(56) References Cited

U.S. PATENT DOCUMENTS

| 4,092,637 A | 5/1978 | Barclay et al. |
| 6,519,548 B1 * | 2/2003 | Kuroda .................. B63C 11/32 128/201.27 |

(Continued)

FOREIGN PATENT DOCUMENTS

| CH | 377 739 A | 6/1964 |
| CN | 1444115 A | 9/2003 |

(Continued)

OTHER PUBLICATIONS

European Search Report dated Nov. 20, 2018 in European Application 18173871.7 filed on May 23, 2018 (with English Translation of Categories of Cited Documents & Written Opinion).

(Continued)

*Primary Examiner* — Edwin A. Leon
(74) *Attorney, Agent, or Firm* — Oblon, McClelland, Maier & Neustadt, L.L.P.

(57) ABSTRACT

A watch including a watch case provided with a case middle, the case middle carrying an element provided with at least one index and defining an inner cavity. The watch further includes at least one pair of electrodes and at least one light source device connected to the electrode pair and arranged opposite the index, the electrodes of the electrode pair being fixed inside the inner cavity, the element being water permeable such that, when the watch is immersed in seawater, the seawater can penetrate the inner cavity so that the electrode pair and the seawater form an electrochemical cell, for powering the light source device.

23 Claims, 2 Drawing Sheets

(58) Field of Classification Search
USPC .............................................. 368/227, 10–11
See application file for complete search history.

(56) References Cited

U.S. PATENT DOCUMENTS

| | | | | |
|---|---|---|---|---|
| 6,618,059 | B1* | 9/2003 | Furuta | B63C 11/32 |
| | | | | 715/710 |
| 6,850,152 | B1* | 2/2005 | Woodall | G08B 5/38 |
| | | | | 340/332 |
| 7,448,378 | B2* | 11/2008 | Hirose | B63C 11/02 |
| | | | | 128/201.27 |
| 8,988,226 | B2* | 3/2015 | Vinano | A01K 79/02 |
| | | | | 340/573.1 |
| 2010/0202255 | A1* | 8/2010 | Klopfenstein | G04B 19/32 |
| | | | | 368/226 |
| 2018/0052426 | A1* | 2/2018 | Ferri | G04B 19/30 |

FOREIGN PATENT DOCUMENTS

| | | |
|---|---|---|
| CN | 1490685 A | 4/2004 |
| CN | 2805834 Y | 8/2006 |
| CN | 1860410 A | 11/2006 |
| CN | 204374629 U | 6/2015 |
| CN | 106999121 A | 8/2017 |
| CN | 107111283 A | 8/2017 |
| CN | 107430381 A | 12/2017 |
| CN | 207008292 U | 2/2018 |
| FR | 606 277 A | 6/1926 |
| FR | 2 325 955 A1 | 4/1977 |
| JP | 53-60266 | 5/1978 |
| JP | 9-119986 A | 5/1997 |
| JP | 11-258000 A | 9/1999 |

OTHER PUBLICATIONS

Combined Chinese Office Action and Search report dated Nov. 16, 2020 in Chinese Patent Application No. 201910422863.0 (with English translation), 13 pages.

Notice of the Reason for Refusal dated Jul. 21, 2020 in Japanese Patent Application No. 2019-088052 (with English language translation), 4 pages.

Combined Chinese Office Action and Search Report dated Jul. 5, 2021 in Chinese Patent Application No. 201910422863.0 (with English translation of Category of Cited Documents), 7 pages.

* cited by examiner

Fig. 1
Fig. 2
Fig. 3
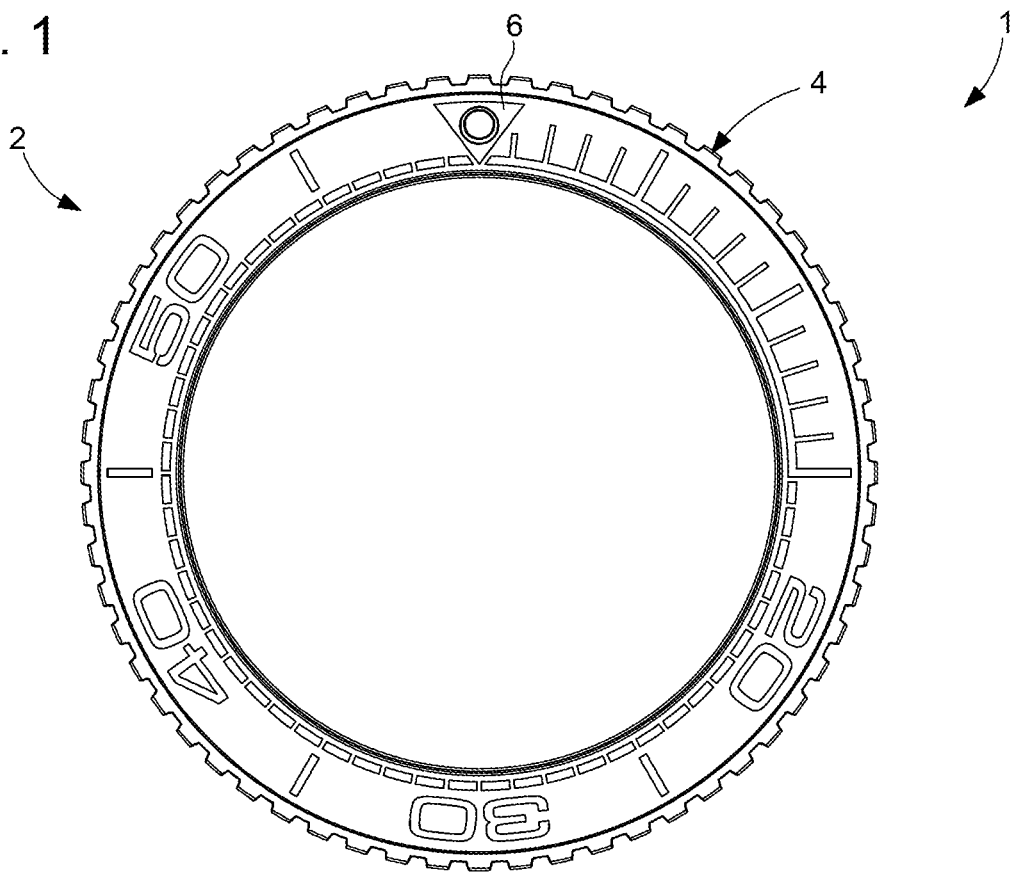
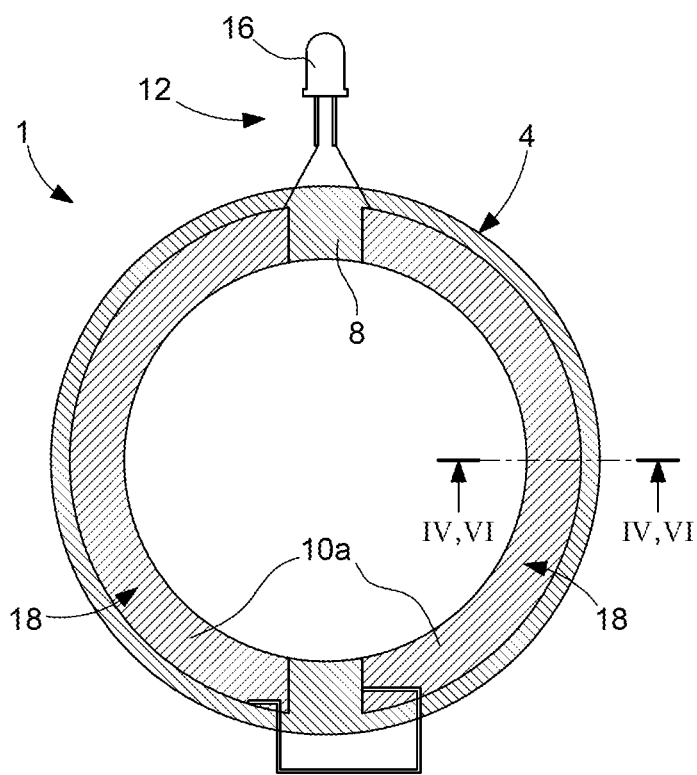
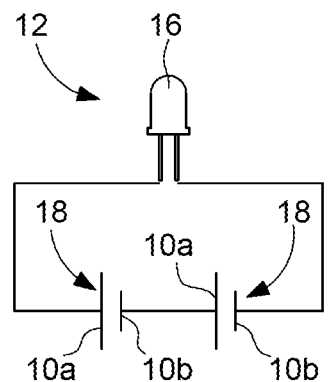

WATCH COMPRISING AN ELEMENT PROVIDED WITH AN ILLUMINABLE INDEX

CROSS-REFERENCE TO RELATED APPLICATION

This application claims priority to European Patent Application No. 18173871.7 filed on May 23, 2018, the entire disclosure of which is hereby incorporated herein by reference.

FIELD OF THE INVENTION

The invention concerns a watch comprising a watch case provided with a case middle, wherein the case middle carries an element provided with at least one illuminable index.

The watch is configured to be able to be immersed in seawater, such as, for example, a diver's watch.

BACKGROUND OF THE INVENTION

In the field of watches having a watch case provided with a case middle, it is known to arrange on the case middle an element provided with at least one illuminable index. In the case of a diver's watch, the element is, for example, a rotating bezel and the index, for example, indicates a reference position for the diver to measure his immersion time in the ocean. To achieve this, the diver rotates the bezel so as to align the index with the minute hand. This position then becomes the reference for measuring elapsed time. One of the main efficiency criteria of a diver's watch must be the legibility of the time and of the index during the immersion phase.

In order to meet this criterion, a known solution consists in coating the bezel index and the watch hands with a phosphorescent material. This makes the index and the hands visible in low lighting conditions, typically several metres underwater. Such a diver's watch is, for example, described in French Patent Application No. FR1572837A. However, a drawback of this solution is that it requires charging the phosphorescent elements in advance with sunlight or with an artificial light source, so that said elements can then emit light, for a duration limited to several hours and in a decreasing manner (type of phosphorus, quantity, charge duration and intensity prior to diving), in a dark environment, for example underwater.

Wristwatches having a dial provided with several luminous indices are also known, allowing information on the dial to be read in the dark as well as in broad daylight.

Such a wristwatch is, for example, disclosed in WO Patent Application No. 2016146350 A1. The wristwatch includes a watch case, a rotating bezel mounted on the watch case and a dial provided with several luminous indices. The luminous indices are illuminated through the dial by a light source disposed underneath the dial and powered by an electrical energy source such as a cell or rechargeable storage battery. A light source activation component is housed inside the rotating bezel and cooperates with a detection component housed inside the watch case. Thus, the user can switch on the light source by pivoting the rotating bezel and moving it into a predetermined position in which the presence of the activation component is detected by the detection component which, in response, switches on the light source; here, the bezel acts like a switch. However, when the electrical energy source runs out, it must be replaced or manually charged again, which is restrictive for the user.

SUMMARY OF THE INVENTION

It is thus an object of the invention to provide a watch allowing the index to be illuminated in low lighting conditions, especially underwater, yet which is simple to use and does not require phosphorescent elements to be charged in advance or an electrical energy source to be replaced or manual charged.

To this end, the invention concerns a watch, which includes the features mentioned in the independent claim 1.

Specific embodiments of the watch are defined in the dependent claims 2 to 20.

One advantage of this watch according to the invention lies in the use of a pair of electrodes fixed inside an inner cavity of the element and a light source device connected to the pair of electrodes and arranged opposite the index. The element is water permeable so that, when the watch is immersed in seawater, seawater can penetrate the inner cavity. The pair of electrodes and the seawater thus form an electrochemical cell. Thus, when the watch is immersed, seawater enters the space between the electrodes, thereby switching on the battery thus formed and powering the light source device. This offers a particularly simple solution for illuminating the index in low lighting conditions underwater, without requiring an operation to replace or manually charge an electrical energy source. Further, the index is illuminated and remains illuminated as soon as the watch is immersed, without the user having to press any particular buttons or control members.

According to a preferred embodiment of the invention, the element is an annular bezel rotatably mounted around the case middle, the bezel defining an inner cavity leading to the exterior of the watch case. The electrode pair and the light source device are preferably integral with the annular bezel so as to rotate around the case middle at the same time as the bezel.

Advantageously, the watch further includes a mechanical element for separating the two electrodes of the pair of electrodes. This prevents any physical contact between the electrodes.

Advantageously, the watch includes several pairs of electrodes of opposite polarity, the electrode pairs being series connected to each other. Thus, for example, when the light source device includes at least one light emitting diode, the diode threshold voltage is reached more quickly to switch it on.

According to a particular technical feature of the invention, the light source device includes at least one light emitting diode.

Advantageously, the light emitting diode is coated with a protective resin able to electrically isolate the light emitting diode from water. This protects and electrically isolates the light emitting diode from water.

Also advantageously, the light emitting diode is arranged inside the inner cavity of the element, underneath the index. This particularly configuration allows efficient illumination of the index when the watch is immersed in seawater.

According to a particular technical feature, the index is formed of an aperture arranged in the element, said aperture being provided with a window able to let in light. Preferably, the window is made of a sapphire glass.

Advantageously, at least one of the free surfaces of the sapphire glass is frosted. This diffuses the light emitted by the light source device better and increases the angle of view of the illuminated index.

According to a particular embodiment of the invention, the electrodes of the electrode pair are selected such that the electrode pair and seawater form a Leclanché type electrochemical cell. This particular example embodiment has the advantage of obtaining improved electric power for the electrochemical cell.

According to another particular example embodiment of the invention, the electrodes of the electrode pair are selected such that the electrode pair and the seawater form a metal-air electrochemical cell. This example embodiment has the advantage of obtaining high energy density for the electrochemical cell.

Advantageously, one anode of the electrode pair is formed of a metal material chosen from the group consisting of aluminium, zinc and magnesium. Such materials have the advantage of being very energetic.

Thus, if the cell dries quickly and thus becomes inactive between two successive immersions, corrosion of the anode will not have time to significantly affect the galvanic performance of the cell.

Advantageously, an inner wall of the inner cavity is coated with a layer of a water soluble salt. This offers the advantage of also allowing the watch to be used in a fresh water environment. Indeed, the salt, combined with the fresh water in which it dissolves, then forms an electrochemical cell with the electrode pair.

Advantageously, the watch also includes an external actuator and an additional light source arranged inside the watch case facing a dial of the watch, the external actuator and the additional light source being connected to the electrode pair. Thus, through contact on the electrodes via actuation of the external actuator, it is also possible to power the additional light source, and thus to illuminate not only the index but also the watch dial and hands.

BRIEF DESCRIPTION OF THE DRAWINGS

The objects, advantages and features of the watch according to the invention will appear more clearly in the following description, based on at least one non-limiting embodiment illustrated by the drawings, in which:

FIG. 1 is a top view of a watch according to a preferred embodiment of the invention, the watch comprising an annular bezel provided with an index.

FIG. 2 is a schematic view of the interior of the watch of FIG. 1, the watch comprising a light emitting diode and two cells in series each including a pair of electrodes.

FIG. 3 is a schematic representation of the watch of FIG. 2.

DETAILED DESCRIPTION OF THE INVENTION

Figure 4:
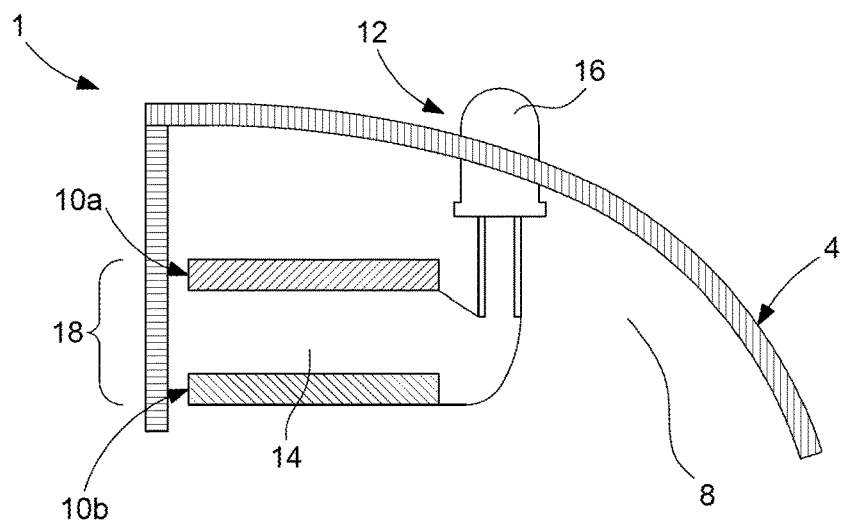
FIG. 4 is a sectional view, taken along a sectional plane IV-IV, of the watch of FIG. 2 according to a first variant, with the light emitting diode in an off state.

FIG. 1 represents a watch 1 provided with a watch case 2. Watch case 2 includes a case middle, but this case middle is not represented in the Figures for reasons of clarity. The case middle carries an element 4. Element 4 is provided with at least one index 6 and defines an inner cavity 8, such an inner cavity is visible in FIGS. 2 and 4 to 6. In the preferred embodiment illustrated in FIGS. 1 to 6, element 4 is an annular rotating bezel mounted to rotate around the case middle. In the illustrative example of FIG. 1, watch 1 is a diver's watch and rotating bezel 4 has only one index 6. Index 6 is an illuminable index and forms a reference position, for example for the diver to measure his immersion time in water. However, the present invention is not limited to a diver's watch having an annular rotating bezel, but applies more generally to any watch that comprises a case middle carrying an element provided with at least one index and defining an inner cavity, or any timepiece component having a cavity associated with such an index.

Index 6 is, for example, formed of an aperture arranged in element 4. The aperture is preferably closed by a closure element or window able to let in light. Preferably, the window is made of a sapphire glass. Also preferably, at least one of the free surfaces of the window, which in this case is made of a sapphire glass, is frosted.

As represented in FIGS. 2 and 3, watch 1 further includes at least one pair of electrodes 10a, 10b and at least one light source device 12 connected to the pair of electrodes 10a, 10b. In the illustrative example of FIGS. 2 and 2, watch 1 includes two pairs of electrodes 10a, 10b and a single light source device 12. Preferably, watch 1 further includes a mechanical element 15 for separating the two electrodes 10a, 10b of each electrode pair. A mechanical element 14 of this type is visible in FIGS. 4 to 6.

Also preferably, in a variant, watch 1 can also include an external actuator and an additional light source device; such elements are not shown in the Figures for reasons of clarity. The external actuator is, for example, formed of a push button. The additional light source device is, for example, arranged inside watch case 2 facing a dial of the watch. The external actuator and the additional light source device are connected to the pair of electrodes 10a, 10b.

Figure 5:
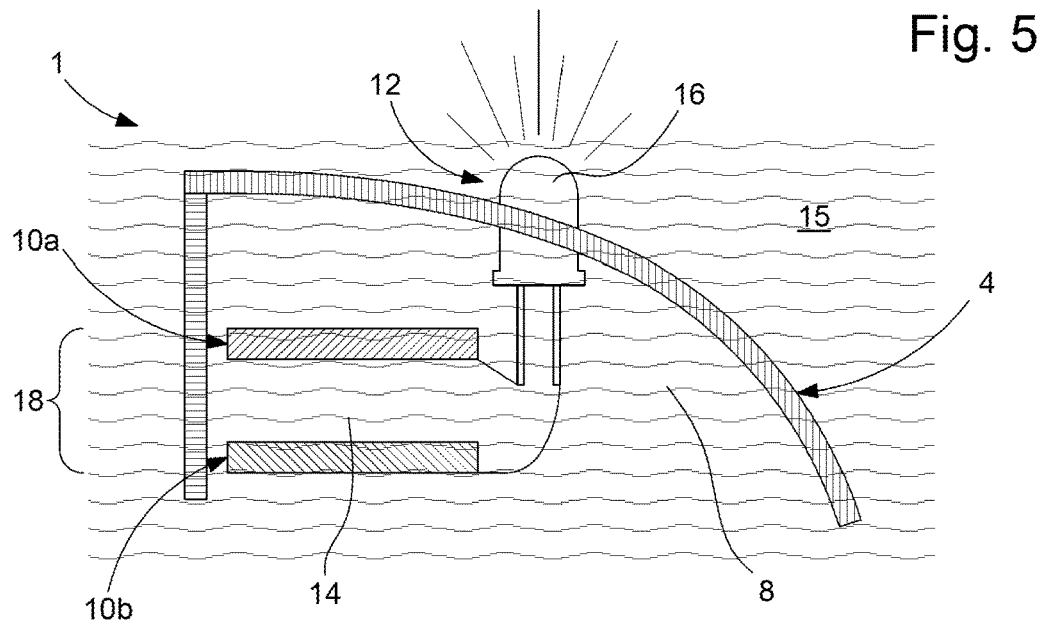
FIG. 5 is a similar view to that of FIG. 4, with the light emitting diode in an on state.
Figure 6:
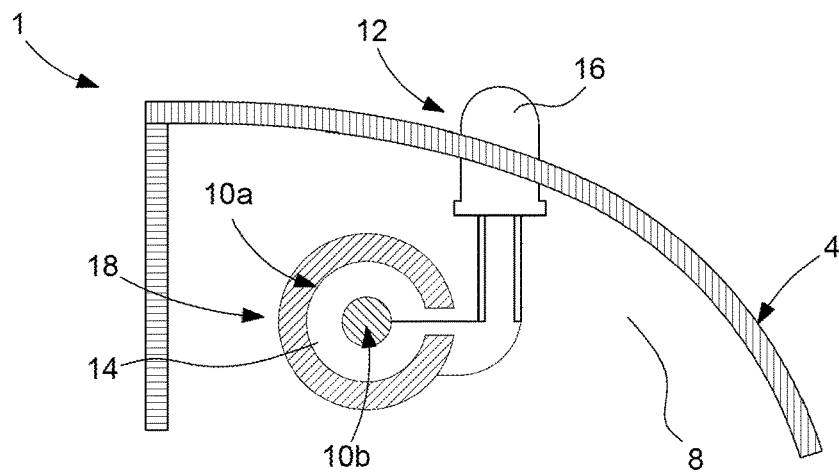
FIG. 6 is a sectional view, taken along a sectional plane VI-VI, of the watch of FIG. 2 according to a second variant.

Element 4 is arranged on the watch case so that water can enter inner cavity 8 and is thus water permeable. For this purpose, inner cavity 8 leads to the exterior through at least one orifice, for example, as illustrated in FIGS. 4 to 6, element 4 is arranged on the middle part of watch case 2 to define an opening to the exterior, which opening is in fluid communication with inner cavity 8. In the illustrative example of FIG. 1, where element 4 is an annular rotating bezel, rotating bezel 4 is, for example, clipped onto and covers the case middle, and for example, defines with the case middle a substantially circular opening, in fluid communication with inner cavity 8. The opening is, in this case, located between the inner edge of bezel 4 and the outer rim of the case middle.

According to a variant, inner cavity 8 is connected to the exterior of the bezel by an orifice 8a arranged in a wall of the bezel and through which liquid can easily enter. Preferably, inner cavity 8 is connected to the exterior by at least two orifices which allow liquid to flow inside said cavity.

Electrodes 10a, 10b are fixed inside inner cavity 8. In this manner, and since element 4 is water permeable, seawater can penetrate inner cavity 8 when watch 1 is immersed in seawater, and thus come into contact with electrodes 10a, 10b. The pair(s) of electrodes 10a, 10b and the seawater thus form an electrochemical cell intended to electrically power light source device 12, as will be described in more detail below. Rich in salt and ions, seawater acts as an electrolyte which activates an oxidation-reduction reaction at the electrodes. Electrodes 10a, 10b are mechanically retained inside inner cavity 8 so that they never come into contact with each other or with the surface of rotating bezel 4.

In the illustrative example of FIGS. 2 and 3, in which watch 1 includes two pairs of electrodes 10a, 10b, each electrode pair includes one electrode 10a of positive polarity, also called the cathode; and one electrode 10b of negative polarity, also called the anode. Each electrode pair 10a, 10b forms a current generator cell 18, the two cells 18 being series connected to each other, as illustrated in FIG. 2 and in the equivalent circuit of FIG. 3. More precisely, the anode 10b of a first electrode pair is connected to the cathode 10a of a second electrode pair. The cathode 10a of the first electrode pair and the anode 10b of the second electrode pair are connected to respective terminals of light source device 12. As seen in FIG. 2, electrodes 10a, 10b are cut into the shape of rotating bezel 4. In a variant that is not represented, the number of series connected electrode pairs 10a, 10b can be chosen to be greater than or equal to three.

In a first variant illustrated in FIGS. 4 and 5, the two electrodes 10a, 10b of each electrode pair each have a flat geometry and extend parallel and opposite to each other inside inner cavity 8. In this variant, mechanical element 14 for separating the two electrodes 10a, 10b is, for example, formed of a fabric membrane. The fabric membrane is, for example, arranged between the two electrodes 10a, 10b of each electrode pair. When watch 1 is immersed in seawater 15, the space between electrodes 10a, 10b fills with seawater 15. The electrochemical cell formed by electrodes 10a, 10b and seawater 15 is then activated via an oxidation-reduction reaction produced between electrodes 10a, 10b and seawater 15. Light source device 12 then changes from an off state, represented in FIG. 4, to an on state, represented in FIG. 5.

According to a second variant illustrated in FIG. 6, the two electrodes 10a, 10b of each electrode pair each have a cylindrical geometry. The two electrodes 10a, 10b of each electrode pair are arranged concentrically inside inner cavity 8. For example, the cathode 10a of each electrode pair, formed of foil, surrounds anode 10b of the same electrode pair. In a variant that is not represented, the anode 10b of each electrode pair can surround the cathode 10a of the same electrode pair. In this second variant, mechanical element 14 for separating the two electrodes 10a, 10b is, for example, formed of an ion permeable membrane. The ion permeable membrane is, for example, arranged between the two electrodes 10a, 10b of each electrode pair and thus provides the spacing between the two electrodes 10a, 10b. The operation of watch 1 according to this second variant is similar to that of watch 1 according to the first variant, the seawater filling the space between the two concentric electrodes 10a, 10b.

Preferably, an inner wall of inner cavity 8 is coated with a layer of a water soluble salt, although this salt layer is not represented in the Figures for reasons of clarity. This also allows the watch according to the invention to be used in a fresh water environment.

Light source device 12 is arranged facing index 6, thereby illuminating index 6. Preferably, as represented in FIGS. 2 and 4 to 6, light source device 12 is integral with rotating bezel 4. Also preferably, light source device 12 includes at least one light emitting diode 16. In the illustrative example of FIGS. 2 to 6, light source device 12 includes a single light emitting diode 16. Light source device 12 can also include a resistor connected in series to light emitting diode 16. Such a resistor, not represented in the Figures, is intended to limit the current flowing through light emitting diode 16 and thus to protect the latter. This makes it possible to ensure a constant current in the circuit of light emitting diode 16.

Light emitting diode 16 is preferably coated with a protective resin able to electrically isolate light emitting diode 16 from water. Such a protective resin is not represented in the Figures for reasons of clarity. Light emitting diode 16 is, for example, arranged inside inner cavity 8 of element 4, underneath index 6 in order to illuminate the latter. The threshold voltage of the light emitting diode is, for example, comprised between 2.6 V and 3 V.

Several particular example embodiments will now be described for electrodes 10a, 10b.

According to a first particular example embodiment, one of the electrodes of the electrode pair 10a, 10b is a zinc electrode, and the other electrode of the electrode pair 10a, 10b is a copper electrode. According to this particular example embodiment, the seawater is reduced to produce hydrogen. The oxidation-reduction reaction which is produced between electrodes 10a, 10b and the seawater generates an ion current in the volume of water that has penetrated cavity 8 of bezel 4, and transport of electric charges corresponding to the current required to power light source device 12. The cell thereby formed in this first particular example embodiment typically has an open circuit voltage on the order of 0.5 V.

According to a second particular example embodiment, electrodes 10a, 10b of the electrode pair are chosen such that the electrode pair 10a, 10b and the seawater form a Leclanché type electrochemical cell. In this particular example embodiment, the seawater acts simply as an electrolyte. Cathode 10a of the electrode pair includes, for example, a manganese oxide deposited on foil. The cell thereby formed in this second particular example embodiment typically has an open circuit voltage on the order of 1.5 V; and produces a current, for example, on the order of 10 mA/g of manganese oxide.

According to a third particular example embodiment, electrodes 10a, 10b of the electrode pair are chosen such that the electrode pair 10a, 10b and the seawater form a metal-air type electrochemical cell. According to this particular example embodiment, the oxygen dissolved in the seawater is reduced. Anode 10a of the electrode pair is, for example, formed of a metal material. The metal material is preferably aluminium. In a variant, the metal material can also be zinc or magnesium. The cell thereby formed in this third particular example embodiment typically has an open circuit voltage on the order of 1.5 V. In this third particular example embodiment, it is necessary to provide good convection of seawater inside the watch to renew the oxygen used, which can be achieved by optimising the number and shape of apertures in contact with the exterior of the bezel.

The preceding description of the watch according to the invention was made with reference to an element provided with a single index and defining a single inner cavity; and with reference to a single light source device. However, those skilled in the art will understand that the invention applies in the same way to watches comprising a plurality of indices, inner cavities, electrode pairs and light source devices each respectively associated with an index.

It will also be noted that the light source device according to the invention is energetically autonomous so that it can be fitted equally to a watch comprising a mechanical movement and to a watch comprising an electronic or hybrid movement.

Finally, the use of an LED as the preferred light source to mark the diving index advantageously makes it possible to choose the colour of the latter, since the range of LED colours covers a wide colour palette unlike phosphorescent materials which are always orange, green or light blue. A person who usually dives in blue water will find it advantageous to choose a yellow LED in order to obtain maximum contrast. Likewise, a person who usually dives in greenish water will advantageously choose a red LED.

The invention claimed is:

1. A watch, comprising:
   a watch case;
   a case middle; and
   an element provided with at least one index and defining an inner cavity, wherein
   the watch further includes at least one pair of electrodes and at least one light source device connected to the electrode pair and arranged opposite the index,
   the electrodes of the electrode pair are fixed inside the inner cavity,
   the element is water permeable such that, when the watch is immersed in seawater, the seawater penetrates the inner cavity so that the electrode pair and the seawater form an electrochemical cell, for powering said light source device.

2. The watch according to claim 1, wherein the element is an annular bezel mounted to rotate around the case middle, the bezel defining the inner cavity leading to an exterior of the watch case.

3. The watch according to claim 2, wherein the electrodes of the electrode pair each has a flat geometry and extend parallel and opposite to each other inside the inner cavity of the bezel.

4. The watch according to claim 2, wherein the electrodes of the electrode pair each has a flat geometry and are arranged concentrically inside the inner cavity of the bezel, a first electrode formed of foil surrounding a second electrode.

5. The watch according to claim 1, wherein the watch further includes a mechanical element for separating and/or electrically isolating the electrodes of the electrode pair.

6. The watch according to claim 5, wherein the mechanical separation element is formed of a fabric or polymer membrane.

7. The watch according to claim 5, wherein the mechanical separation element is formed of an ion permeable membrane.

8. The watch according to claim 1, wherein the watch includes several pairs of electrodes of opposite polarity, the electrode pairs being series connected to each other.

9. The watch according to claim 1, wherein the light source device comprises at least one light emitting diode.

10. The watch according to claim 9, wherein the light emitting diode is coated with a protective resin able to electrically isolate the light emitting diode from water.

11. The watch according to claim 9, wherein the light emitting diode is arranged inside the inner cavity of the element, underneath the index.

12. The watch according to claim 1, wherein the index is formed of an aperture arranged in the element, said aperture being provided with a window able to let in light.

13. The watch according to claim 12, wherein the window is made from a sapphire glass.

14. The watch according to claim 13, wherein at least one of free surfaces of the sapphire glass is frosted.

15. The watch according to claim 1, wherein
   a first electrode of the electrode pair is a zinc electrode, and
   a second electrode of the electrode pair is a copper electrode.

16. The watch according to claim 1, wherein the electrodes of the electrode pair are chosen such that the electrode pair and the seawater form a Leclanché type electrochemical cell.

17. The watch according to claim 16, wherein a cathode of the electrode pair includes a manganese oxide deposited on a foil.

18. The watch according to claim 1, wherein the electrodes of the electrode pair are chosen such that the electrode pair and the seawater form a metal-air type electrochemical cell.

19. The watch according to claim 18, wherein an anode of the electrode pair is formed of a metal material chosen from the group consisting of aluminium, zinc and magnesium.

20. The watch according to claim 1, wherein the element is a rotating bezel.

21. The watch according to claim 1, wherein the watch comprises a plurality of indices of inner cavities of electrode pairs and of light source devices each respectively associated with an index.

22. The watch according to claim 1, wherein an inner wall of the inner cavity is coated with a water soluble salt layer.

23. The watch according to claim 1, wherein the watch also comprises an external actuator and an additional light source arranged inside the watch case facing a dial of the watch, the external actuator and the additional light source being electrically connected to the electrode pair.

* * * * *